(No Model.) 2 Sheets—Sheet 2.
P. PEARSON.
PORTABLE ELECTRIC SIGNALING DEVICE.

No. 434,835. Patented Aug. 19, 1890.

WITNESSES:
J. A. Criswell
C. Sedgwick

INVENTOR:
P. Pearson
BY
Munn & Co.
ATTORNEYS

UNITED STATES PATENT OFFICE.

PETER PEARSON, OF NEW YORK, N. Y.

PORTABLE ELECTRIC SIGNALING DEVICE.

SPECIFICATION forming part of Letters Patent No. 434,835, dated August 19, 1890.

Application filed April 2, 1890. Serial No. 346,292. (No model.)

*To all whom it may concern:*

Be it known that I, PETER PEARSON, of New York city, in the county and State of New York, have invented a new and useful Portable Electrical Signaling Device, of which the following is a full, clear, and exact description.

This invention relates to an improved means for transmitting signals from one point to another by a portable device embodying a bell and mechanism to operate it intermittingly when electrical connection is established and broken between the sending and receiving points.
The nature and object of this invention consist in providing a simple portable apparatus contained in a box and so arranged that the lid of the box must be closed to complete electrical connection between an electromagnetic bell on the lid and a battery in the box.

A further provision consists in furnishing conductor-wires, which are flexible, insulated, and adapted to be extended from the box to any point from which signals are to be sent in open circuit, the same being closed and opened successively at proper intervals by the use of a transmitter of peculiar construction, which is attached to the outer terminals of the conductor-wires, as is hereinafter more fully described, and indicated in the claims.

Reference is to be made to the accompanying drawings, forming a part of this specification, in which similar letters of reference indicate corresponding parts in all the figures.

Figure 1:
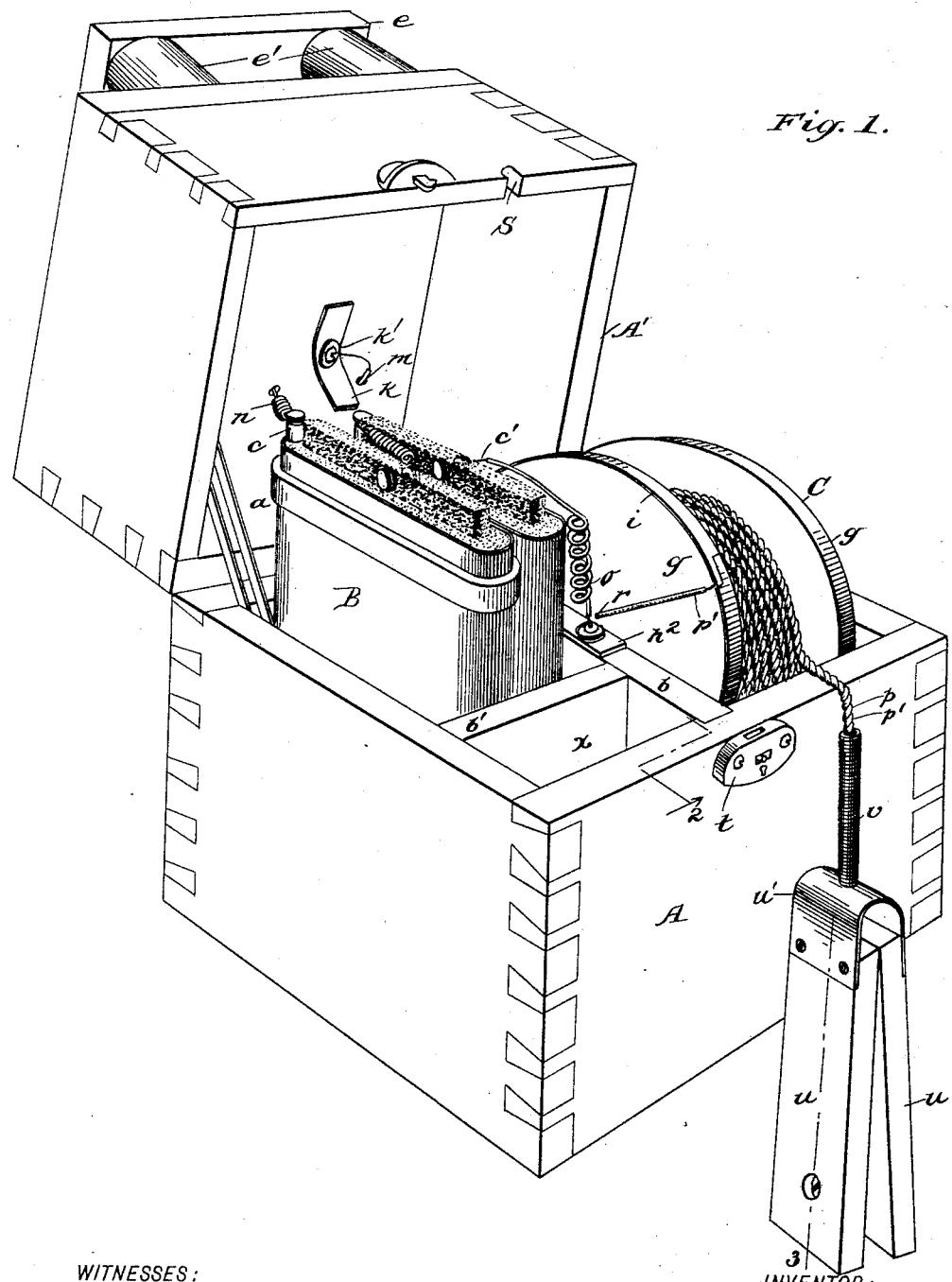
Figure 2:
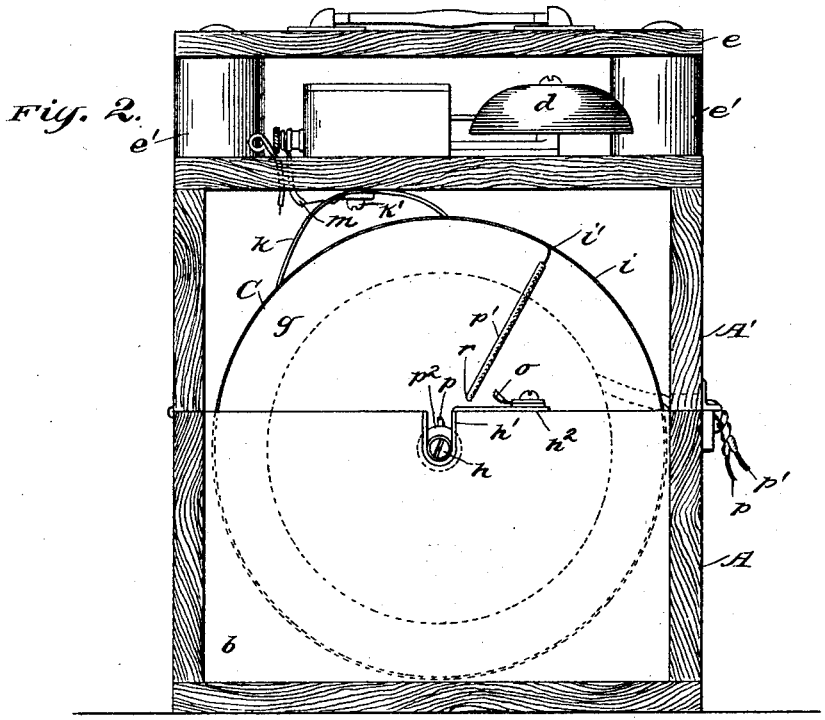
Figure 3:
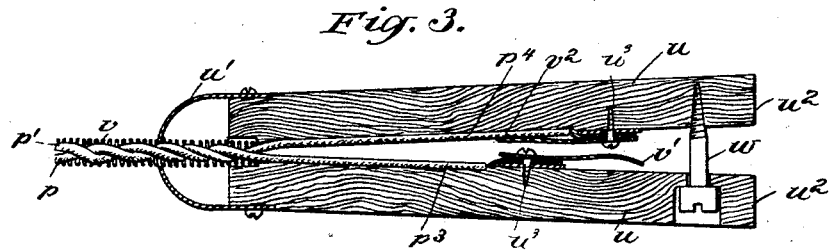
Figure 4:
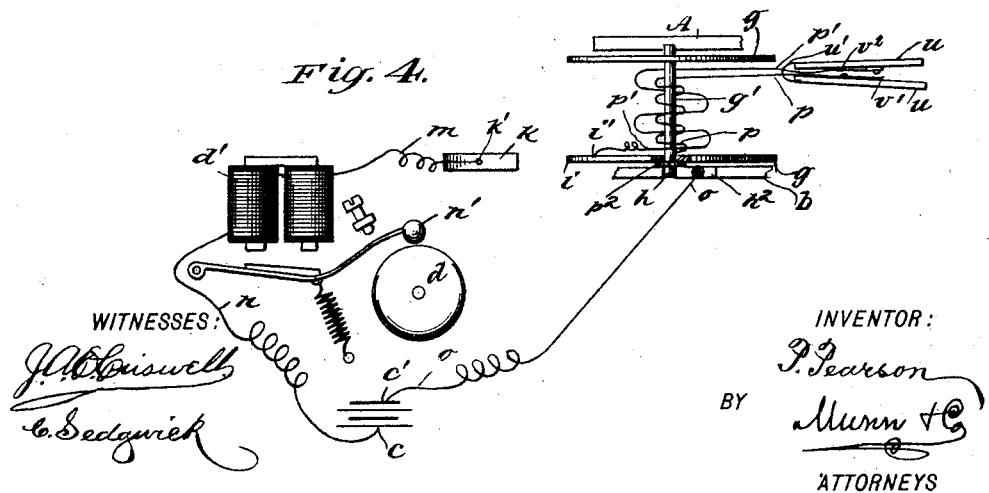

Figure 1 is a perspective view of the portable signaling device, the lid of the containing-box being open. Fig. 2 is a side elevation in section of the device, taken on the line 2 in Fig. 1, the electrical connections being broken. Fig. 3 is an enlarged detached view of the transmitter in section, taken on the line 3 in Fig. 1; and Fig. 4 is a diagram illustrating the electrical connection of parts of the signaling device.

A rectangular box A, of hard wood or other suitable material, is provided to receive and stably support the parts of the device that are placed therein. The lid A' of the box A is hinged thereto at one edge, and is limited in its open adjustment by a slotted bar $a$, which is secured to the lid pivotally and engages a stud or screw-shank on the inner surface of the box, this being a common device for such a purpose.

Near the center of width of the box A there is a divisional wall $b$, inserted between the front and rear sides of the same, and one of the compartments thus produced is subdivided by a transverse partition $b'$ to provide a pocket of proper capacity for the reception and retention of the cells of a battery B.

While it is preferred to employ a dry battery that for obvious reasons is best adapted for a portable apparatus, the construction is not limited to such a type of electrical generator, any form of battery having proper capacity being available, if sufficiently compact and convenient, weight and size being important features to consider.

Upon the lid of the box a signal-bell $d$ and its double-coil magnet $d'$ (shown detailed in the diagram, Fig. 4) are secured, and to prevent injury thereto a guard comprised of a plate or piece of board $e$ is held above the electric bell by bolts or other means, the securing devices being inserted through the spacing-blocks $e'$, which are located at the corners of the guard-cover. Any preferred style of electric bell may be utilized to provide signals, if the same be not too large and has a bell of gong form that is adapted to be rung one or more times successively at intervals to produce distinct signals in accordance with a predetermined code.

In the compartment which is parallel to the battery-pocket a detachable reel is revolubly located. Said reel C consists, essentially, of two circular flanges $g$, of hard wood or other non-electric material, held spaced apart by a hard wooden shaft $g'$, centrally inserted in the disks or flanges.

Notches of proper depth and diameter are oppositely formed in the edges of the side and middle walls of the box A for the revoluble support of journal ends which project from the axis of the center shaft or drum $g'$, the bottoms of the notches being adapted to retain the journals as boxes, whereby the reel C is supported free to revolve.

On the side of the reel C which is adjacent to the middle wall $b$ the metal journal-pin $h$ is supported by a metal box $h'$, that is embedded in the groove of the wall $b$, said box $h'$ having a flange $h^2$ made integral therewith and extended toward the front wall of the box A, resting upon and secured to the top edge of the middle wall $b$. A continuous metal band $i$ is placed on the periphery of the flange $g$ that is nearest to the wall $b$ and firmly secured thereto, having a smooth true exterior surface.

On the inner surface of the top wall of the box-shaped lid $A'$, directly above the metal band $i$, which, as before stated, encircles the flange $g$, a curved metallic-plate spring-piece $k$ is secured by a binding-screw $k'$, beneath which the uninsulated end of a connecting-wire $m$ is placed and clamped in contact with the plate $k$, the other end of this insulated wire being upwardly projected through a hole in the lid $A'$ and secured by a binding-post to one end of the magnet-coil $d'$, the opposite end $n$ of said coil being extended toward and secured to one pole $c$ of the battery B. The plate-spring $k$ is given such a comparative length and degree of curvature from the point where it is clamped upon the box-lid $A'$ that it will have an enforced contact with the band $i$ on the reel-flange $g$, by engagement of both ends therewith, which will produce a rubbing contact when the lid $A'$, is closed, and as said band is circular the positive engagement of the spring-plate $k$ is assured at any point on the periphery of the band $i$. An insulated connecting-wire $o$ is electrically attached by one end to the opposite pole $c'$ of the battery which is on the cell that is nearest to the middle wall $b$, and thence said wire is led to be connected at its other end with the extended flange $h^2$ of the box $h'$, whereby the journal-pin $h$ of the reel is put into direct metallic connection with the pole $c'$ of the battery B.

To afford means for transmission of signals electrically from a point distant from the apparatus in the box $d'$, thus attracting the hammer $n'$ of the bell $d$ and intermittingly sounding said bell, two insulated conductor-wires $p\ p$ are provided, these for convenience being twisted together as a leading cable. The separated and insulated ends of the wires $p\ p$ are respectively attached to form an open battery-circuit. To effect this the wire $p$ is inserted through a perforation in the reel-flange that has the band $i$ upon it, and engages a clamping-washer $p^2$, which is held in place by the enforced contact of the journal-pin $h$. The other wire $p'$ of the cable is inserted through an orifice in the banded flange of the reel at $r$, and thence is upwardly projected to have electrical contact with the band $i$ at $i'$, said wire $p'$ being embedded in the surface of the reel-flange and inserted beneath the band thereon to avoid contact with other parts. From the description given it will be apparent that the two leading conductor-wires $p\ p'$ are in metallic connection with the battery-poles $c\ c'$, and also have in open circuit the magnet-coil $d'$ of the signaling device. A sufficient length of the cable comprised of the insulated leading wires $p\ p'$, is provided to reach to any convenient distance within the holding capacity of the reel C, and is wrapped upon the reel when not in service, there being a notch cut at $s$, in the free edge of the lid $A'$, to permit the cable to project its outer end from the box when closed and locked by the spring-lock $t$, or other preferred means.

To produce signals, one or more, upon the bell $d$ from a point distant therefrom, it is only necessary to bring into electrical connection the separated ends of the two wires $p\ p'$. To do this with precision by a contraction of the hand of the operator the transmitter shown in section in Fig. 3 has been provided. This simple device consists of a pair of elongated non-electric strips $u$, preferably made from hard wood, of such relative dimensions that they may together be readily grasped when signals are to be made. The handle-strips $u$ are yoked together at one end by a spring arch-piece $u'$, which is fastened by screws to the strips and holds them normally spread apart a short distance at their free ends $u^2$. The heels of the engaged ends of the strips being in contact serve as fulcrum-points to cause a divergence of the strip ends $u^2$ when released from a gripping-pressure that will cause their adjacent surfaces to nearly impinge upon each other. The respective ends $p^3\ p^4$ of the wires $p\ p'$ are introduced through a spring-sleeve $v$, which sleeve serves to keep these ends of the cable extended and prevents kinking when it is in position. The sleeve $v$ is inserted through a hole in the arch-spring $u'$, that aligns with a socket-orifice produced in the joined ends of the handle-strips $u$, into which the end of the spring-sleeve is placed and seated, thereby affording protection to the wires and preventing injury to the insulation on the same, which might occur from a chafing contact with the arch-plate. The ends $p^3\ p^4$ of the wires $p\ p'$ are separated where they project from the seated end of the spring-sleeve $v$ and extend embedded in the opposite faces of the handle-strips $u$. Their terminals being stripped of insulating materials are clamped by the contact-springs $v'\ v^2$ upon the handle-strips $u$, the screws $u^3$ passing through these springs into the wooden handle-strips. It will be seen in Fig. 3 that the contact-springs are projected in opposite directions longitudinally of the handle-strips $u$, so that their free ends will each engage the clamping-screw head of the other contact-spring. The divergence of the handle-strips $u$ is limited by the set-screw bolt $w$, which is inserted free through one strip into the other, the head of the screw being embedded in a countersink in the free strip whereon this head impinges when the desired degree of divergence is afforded, which should be sufficient to break the circuit produced when the handle-strips $u$ are loosely grasped and successive clamping contractions of the operator's hand produced, which force the contact-springs together and release them intermittingly.

This signaling device is available for use between points in buildings or further removed. The preferred use, however, is to convey signals from the decks or from the hold of a vessel to a point on the wharf alongside of which the vessel lies and is having cargo discharged, as by placing the box A on shore near the hoisting-engine and extending the wires upon the vessel to the lower deck or hold where goods are located, intelligent signals may be conveyed to the engineer on shore to stop or start, go fast or slow, as the needs of the service indicate. A handle is placed on the lid A', which, when the apparatus is not in service, may be utilized to carry the same, the conductor-wire being wrapped upon the reel and the transmitter placed in the small pocket $x$, that is intended for its reception, when the entire device is inclosed ready for transportation by hand-carriage, if desired, the size of the same being preferably restricted to such dimensions and weight as will render it readily portable.

Having thus described my invention, I claim as new and desire to secure by Letters Patent—

1. In a portable signaling device operated by electricity, the combination, with a box having a lid, a bell on the lid, and a contact-spring on the inside of the lid in electrical connection with one terminal of the bell-magnet, of a battery in the box connected in open circuit with the other terminal of the bell-magnet coil, a reel in the box having a metal band that may be impinged by the contact-spring, two insulated wires in open circuit with the battery and reel-band, and a transmitter device that may be manipulated to close the circuit and ring the bell, substantially as set forth.

2. In a portable signaling device operated by electricity, the combination, with a box having a lid, a bell on the lid, and a contact-spring within the lid electrically joined to one terminal of the bell-magnet coil, of a battery in the box, a reel therein having a metal band on one of its flanges, which will be engaged by the contact-spring when the lid is closed, an electrical connection between the other terminal of the bell-magnet coil and a pole of the battery, an electrical connection between the opposite pole of the battery and a metal journal of the reel, two insulated wires electrically joined, one to the reel-band and the other to the reel-journal, and a transmitter device secured to the opposite and separated ends of the wires, which device is adapted to make and break a circuit with the battery and bell when manipulated, substantially as set forth.

PETER PEARSON.

Witnesses:
RUDOLPH BETZ,
JOHN H. ASHTON.